United States Patent

[11] 3,623,019

[72] Inventor George S. Groth
Freehold, N.J.
[21] Appl. No. 880,277
[22] Filed Nov. 26, 1969
[45] Patented Nov. 23, 1971
[73] Assignee Bell Telephone Laboratories, Incorporated
Murray Hill, N.J.

[54] PROGRAMMED TIME-OUT MONITORING ARRANGEMENT USING MAP TIMING
11 Claims, 9 Drawing Figs.

[52] U.S. Cl. .......... 340/172.5
[51] Int. Cl. .......... G06f 9/18
[50] Field of Search .......... 340/172.5; 235/157

[56] References Cited
UNITED STATES PATENTS

| | | | |
|---|---|---|---|
| 3,027,550 | 3/1962 | Lee et al. | 340/172.5 X |
| 3,063,036 | 11/1962 | Reach et al. | 340/172.5 |
| 3,333,252 | 7/1967 | Shimabukuro | 340/172.5 |
| 3,399,387 | 8/1968 | Kunze | 340/172.5 |

*Primary Examiner*—Paul J. Henon
*Assistant Examiner*—Sydney R. Chirlin
*Attorneys*—R. J. Guenther and Kenneth B. Hamlin

ABSTRACT: Multiple, multistation, data lines are independently operable when polling the stations on each line to determine their readiness for communication. Each polling interrogation signal applied to a line causes the storage of a line-timing status bit in one of two duplicate memories in a supervising office. Each such memory contains one bit location per data communication line. Upon the occurrence of a station response to the interrogation, the timing status bit for the corresponding line is erased from memory. The two memories are alternately utilized for receiving timing bits during recurrent periods which are equal to a minimum allowable timeout interval for a station. Prior to each such use, a memory is scanned to detect any timing bits persisting therein and thereby indicating a timeout condition on the corresponding line. Such a condition further indicates a need for a special control routine for the timed out station. Both apparatus and program embodiments of the invention are disclosed.

INVENTOR
G. S. GROTH
BY
Charles Scott Phelan
ATTORNEY

PROGRAMMED TIME-OUT MONITORING ARRANGEMENT USING MAP TIMING

BACKGROUND OF THE INVENTION

1. Field of the Invention

This invention relates to signal interval timing, and it relates more particularly to a method and apparatus for determining whether or not a predetermined minimum time interval expires between the occurrence of first and second signals.

2. Description of the Prior Art

There are a variety of signal interval timing methods known in the art and certain of those methods which are applied to the independent timing of multiple, possibly overlapping, intervals between signals utilize plural independent memory registers for accomplishing the timing operation for each signal pair. In one such arrangement in which linked lists are employed, a circuit name word is stored in a memory register to identify the signal circuit which is being timed. Also stored in the same register is an indication of the magnitude of the unexpired time before timeout will occur. The timing indication is periodically decremented; and when it reaches zero remaining time, the line name is removed from the memory register. A client program, i.e., the program which initiated the timing requests, is advised that timeout has occurred so that further appropriate action may be taken by that program with respect to the station on the line which has timed out.

STATEMENT OF THE INVENTION

The present invention is directed to the reduction of the extent of memory which must be allocated for timing operations. In one illustrative embodiment, duplicate sectors of memory are allocated for storing-timing status bits for each apparatus which can request a timing operation. The occurrence of a first signal event begins an interval which is to be timed, and a timing status bit is stored in one of the two sectors in a location corresponding to the circuit upon which the event occurred. The occurrence of a second anticipated event prior to a predetermined minimum timeout interval causes the timing status bit to be erased. The memory sectors are alternately utilized to receive timing bits during recurring periods, each of which is equal to the minimum timeout interval. However, prior to each such use, the sector which is to be utilized is scanned to detect timing status bits which still persist therein and thus indicate a timeout condition.

BRIEF DESCRIPTION OF THE DRAWING

A more detailed presentation of the present invention is contained in the subsequent description and the attached drawings in which.

DETAILED DESCRIPTION

For purposes of illustration, the signal interval timing method and apparatus of the present invention are depicted in the environment of a communication electronic switching system of the type described, for example, in Vol. XLIII, No. 5, Parts 1 and 2, of *The Bell System Technical Journal* issued in Sept. 1964. Certain aspects of the latter system are further described in the copending application Ser. No. 334,875 filed Dec. 31, 1963, in the names of A. H. Doblmaier et al.

Figure 1:
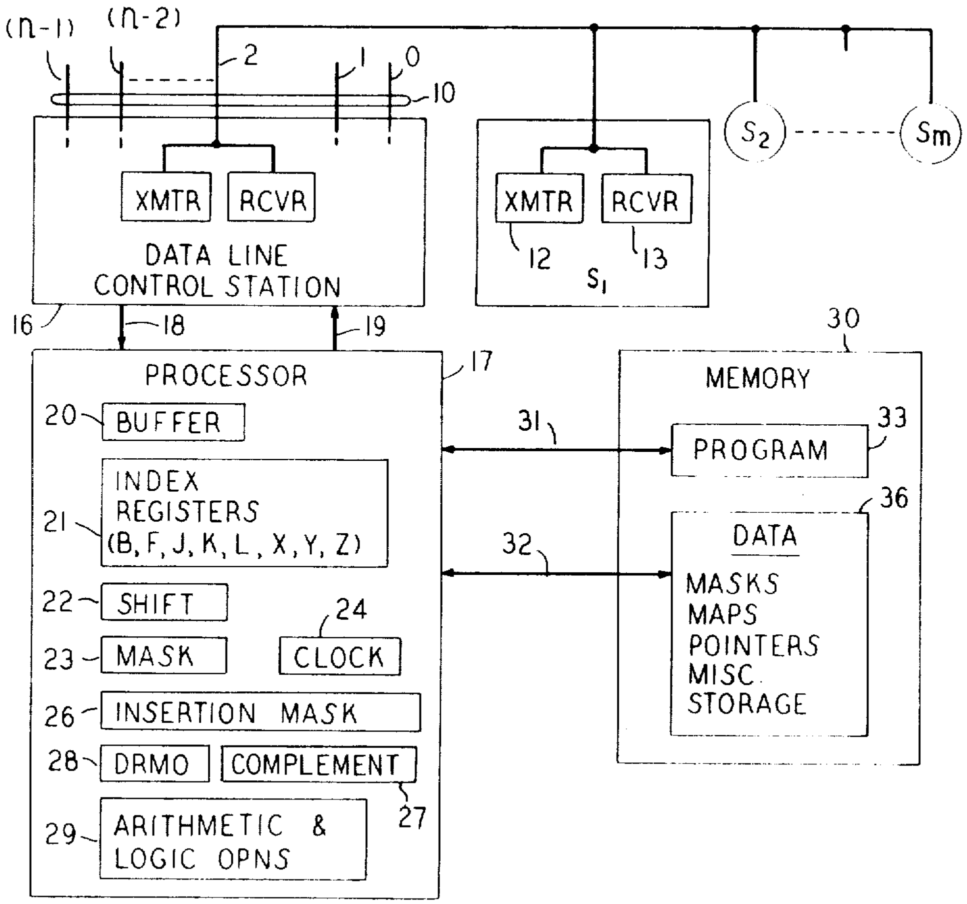
FIG. 1 is a simplified block and line diagram of a programmed data-processing system capable of utilizing the present invention.

In FIG. 1 there is a simplified representation of a data-processing system for use in a communication switching office which serves data transmission circuits, as well as other types of circuits not shown. A plurality of data transmission circuits 10 each serves a plurality of data communication stations. However, only several of the stations S*l* through S*m* associated with the line 2 of the *n* lines coming into the office are shown. Each such station includes the usual apparatus for data transmission network operation as schematically represented by a transmitter 12 and a receiver 13 in the station S*l*.

A data line control station 16 provides the supervisory interface between the lines 10 and the switching office. The station 16 includes transmitting and receiving apparatus for each of the *n* lines served thereby so that it can operate completely independently as to each such line. Associated logic for network supervision of the *n* lines is also provided although not separately shown since it is known in the art and does not comprise part of the present invention. This invention deals with monitoring signal events on the different lines 10 to determine whether or not a first predetermined signal on a line is followed by a second predetermined signal on the same line within at least a predetermined minimum timeout period. Such an interval-timing function is used in a data transmission system of the type indicated in FIG. 1 to monitor the respective data lines for timeout after the polling interrogation of a particular station on a line and before an acknowledgement is received back from that station. If an answer does not occur within the minimum timeout interval a special control routine must be initiated, as is known in the art, to deal with the fact that the station interrogated did not acknowledge in a timely manner. Thus, the data line control station 16 includes polling logic (not shown) to apply appropriate polling signals to the various data lines, to advise a data processor 17 in the same office to start a timing operation for that line, and to terminate that operation when the line acknowledges. Signals from station 16 are applied to the processor 17 by way of a cable 18 including multiple circuits for supplying the various control and address information signals to the processor. Station 16 also receives indications back from the processor by way of a cable 19 for identifying a data line on which timeout has occurred without receipt of station acknowledgement.

As indicated in the aforementioned *Bell System Technical Journal*, the processor 17 includes circuits for performing a variety of functions; and these circuits are simply indicated without particular interconnection in FIG. 1. Those circuits include buffer circuits 20, index registers 21 (of which the indicated registers B, F, J, K, L, X, Y, and Z will be hereinafter mentioned), shift circuit 22, mask circuit 23, a clock-timing source 24, insertion mask circuit 26, complement circuit 27, detect rightmost ONE circuit 28, and circuits 29 for performing the usual arithmetic and logic operations of data-processing systems. Processor 17 also communicates with associated memory 30 for purposes of program and data information as schematically represented by a cable 31 for a program and a cable 32 for data. A program sector 33 and a sector 36 are separately indicated in FIG. 1, and the latter sector of the memory is further subdivided to provide for storage of masks, maps, pointers, and other miscellaneous data items. Detailed interconnections for the processing system of FIG. 1 are not shown because they are taught in the prior art such as that previously identified herein. Furthermore, such parts may be configured in different ways to achieve different results in accordance with program instructions provided thereto as is also well known in the art.

Figure 2:
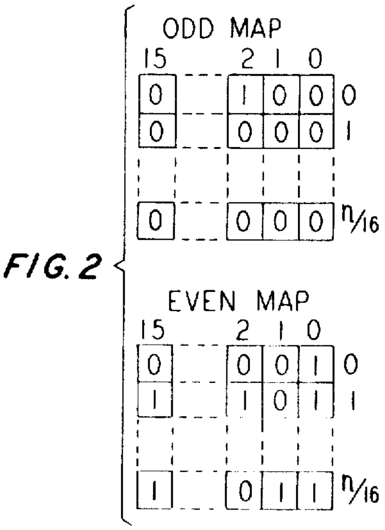
FIGS. 2 and 3 are partial diagrams of portions of the memory in the system of FIG. 1 and illustrate certain aspects of the invention.

The present invention is directed to a type of timing operation which utilizes plural memory map sectors. Two such maps are utilized for purposes of illustration and are designated as the ODD MAP and the EVEN MAP as indicated in FIG. 2. There each of the two maps has *n*/16 16-bit words so that each map includes one bit location corresponding to each different one of the *n* data lines 10 in FIG. 1.

In the operation of the map-timing technique of the present invention, a start-timing request causes a binary ONE to be stored in the map which is at the time loading start-timing indications; and such indication is placed in the bit location corresponding to the data line for which a timing operation is requested. The map which is loading at any given time is determined on a clocked basis by periodically selecting a pointer which steers timing requests to the appropriate map during different timing periods. Thus, at any given time one map is loading timing requests while the other map is standing idle for the purpose of timing. At the end of each period, the functions of the two maps are interchanged. This period is the basic time unit for map timing and it is equal to the predetermined minimum timeout interval for a station on a data line.

As schematically represented in FIG. 2, the EVEN MAP contains a random distribution of ONES and ZEROS wherein the ONES indicate that a timing request had been initiated for a corresponding data line during a preceding interval when the EVEN MAP was loading timing requests. On the other hand, the ODD MAP, which is at this time loading timing requests, has received such a request from the line 2 in FIG. 1. Line 2 corresponds to the third bit position from the right in word zero of each map, but the ONE timing bit is loaded in only the ODD MAP at this time.

If the line 2 should, during the same map-switching period during which the mentioned ONE was loaded, receive an acknowledgement from the interrogated station on that line, the aforementioned binary ONE in the ODD MAP is reset to ZERO; and a similar reset operation is also applied to the EVEN MAP to be sure that both corresponding locations are in the same state, i.e., ZERO, following an acknowledgement This type of operation also assures that the timing status bit will be erased upon acknowledgement even though the acknowledgement may come in a different timing interval from the one in which it was initiated. If no acknowledgement is received within the predetermined minimum timeout interval, which corresponds to the aforementioned map-switching period, and prior to the next time for switching map functions, a timeout will be indicated. The latter indication is produced by scanning the map which is about to begin loading timing requests and resetting any ONES which persist therein at that time. The bit location of each such ONE is identical; and the data line control station 16 in FIG. 1 is advised that a timeout has occurred on the corresponding data line.

In one application of the invention, map functions are switched at about 3-second intervals. Thus, the minimum timeout that can be indicated is about 3 seconds in the case wherein a timing status bit is set at the end of the loading interval of a map and is not reset prior to the scanning operation at the start of the next loading interval for the same map. Of course timeout could run up to about 6 seconds in the same application where a timing status bit is set at the beginning of the loading interval and not reset during either the remainder of that interval or the following idle-timing interval. However, coarse monitoring of this sort is entirely satisfactory for applications such as data station timeout during a polling operation.

Figure 3:
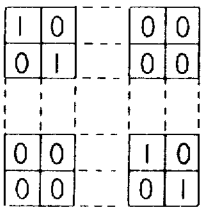

FIG. 3 is a partial diagram of a sector of memory 30 which stores a set of masks to be used in a program embodiment of the present invention for conveniently accessing individual bit locations in the memory maps just described. For the embodiment utilizing 16-bit words, 16 masks are stored in memory, and each of them is a single-ONE mask with the ONE in a different one of the 16 bit positions. This memory sector is that which will subsequently be cited as having the head address Y4DIAG.

Figure 4:
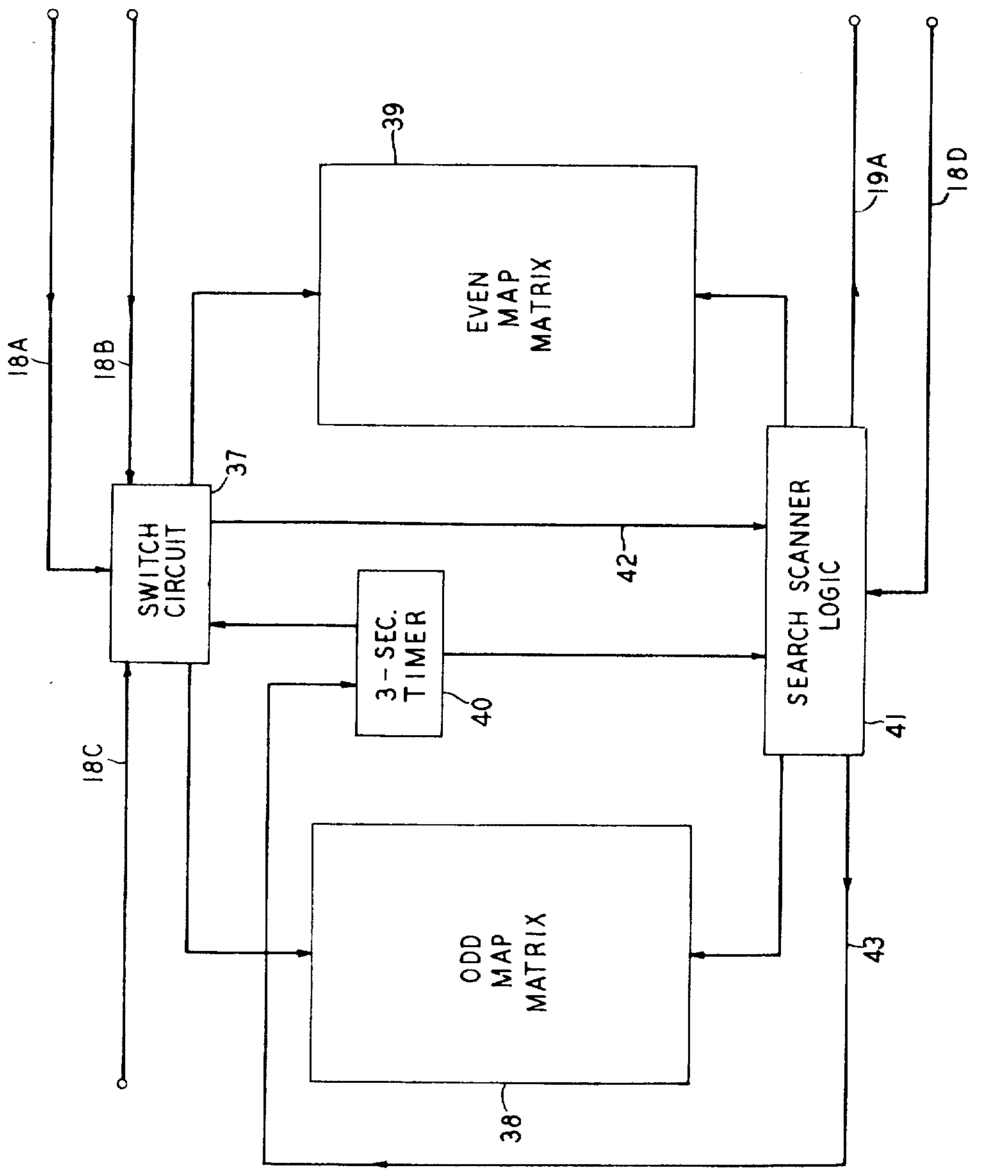
FIG. 4 is a simplified block and line diagram of a system configured in accordance with the present invention.

FIG. 4 is a simplified block and line diagram of one hardware representation of the programmed configuration for the processing system of FIG. 1 when carrying out the present invention. In this embodiment four circuits in the cable 18 provide inputs from the data line control station 16 of FIG. 1, and one circuit in cable 19 is shown as providing an output to the circuit 16. Data line number signals are supplied by a circuit 18A to a switch circuit 37 which steers the data line number signals to the correct one of an odd matrix 38 and an even matrix 39, which correspond to the ODD and EVEN MAPS, respectively, of FIG. 2. Many suitable configurations for the switch circuit 37 will be apparent to those skilled in the art, and one such configuration includes a complementing flip-flop circuit and coincidence logic, not separately shown. Thus, upon the coincidence of data line number signals in circuit 18A and a signal on a circuit 18C indicating that a timing operation is being requested, the switch circuit 37 couples the two signals to the one of the two matrices 38 and 39 indicated by the flip-flop output signal state as controlled by a 3-second timer 40. Within such matrix which is selected to load timing requests, the data line number signals are translated to memory matrix access signals and cooperate with the timing request signal to initiate a drive of appropriate polarity to set the identified bit location to the binary ONE state.

Upon the occurrence of an answer from the interrogated data station before the start of a new loading period for the same map, the data line control station 16 applies a signal to the circuit 18B in FIG. 4. The latter signal in coincidence with the corresponding data line number signals on circuit 18A enable gates within the switching circuit 37 to couple those two signals to both of the matrices 38 and 39. However, if no such acknowledgement is received, prior to the start of a new loading period for the same map, i.e., at least prior to the end of the 3-second, minimum, timeout interval, the timer 30 actuates search scanner logic 41.

Scanner logic 41 responds to a timeout signal from timer 40 by systematically scanning the matrix which is about to begin the loading timing requests as indicated by a signal on a circuit 42 from the switch circuit 37. The logic 41 seeks to determine whether or not bit locations remain in the binary ONE state at this time. If such locations are found, they are reset to ZERO, and the location identified is translated into the corresponding data line number. The latter number is applied by way of circuit 19A to the data line control station 16 in FIG. 1. In one typical hardware embodiment the word locations of a matrix are scanned in sequence to determine whether or not they are in the all-ZERO state. Upon the return of a signal from the station 16 on a circuit 18D to the scanner logic 41, the word then under examination is checked to see whether or not there are additional ONES therein to be handled in the same way, and then the remaining words in the matrix are similarly checked.

The entire matrix scanning in the manner just described typically consumes a few hundred microseconds and does not, therefore, constitute a significant pause between operations of the timer 40. Upon completion of a scanning operation the logic 41 provides a signal indicating that fact on a circuit 43 which restarts the timer 40 to cause switch circuit 37 to steer timing request input signals to a different one of the matrices 38 or 39.

The map-timing technique hereinbefore outlined is advantageously realized by program techniques utilizing the FIG. 1 data-processing system. It has been previously known in the art in communication switching offices to supply to timing apparatus the circuit number of a circuit upon which an initial signal event has occurred and thereafter to supply a further signal indicating that a second event has occurred. The latter event causes a halt in a timing operation previously initiated and causes removal of the number of the circuit from a register in a linked timing list. It is also known in the prior art alternatively to receive from the timing apparatus an indication that a timeout has occurred, and concurrently therewith the number of the circuit being timed is removed from the jurisdiction of the timing circuits, and some further program task is undertaken. Working within such a prior art signal interface including a timing request, acknowledgement to terminate timing, and a signal representing timeout, the present invention involves programs which realize a corresponding timing function by utilizing two memory bits per circuit, instead of requiring a word location of memory per circuit, to store the number of a circuit and its continuing timing information.

Figure 6:
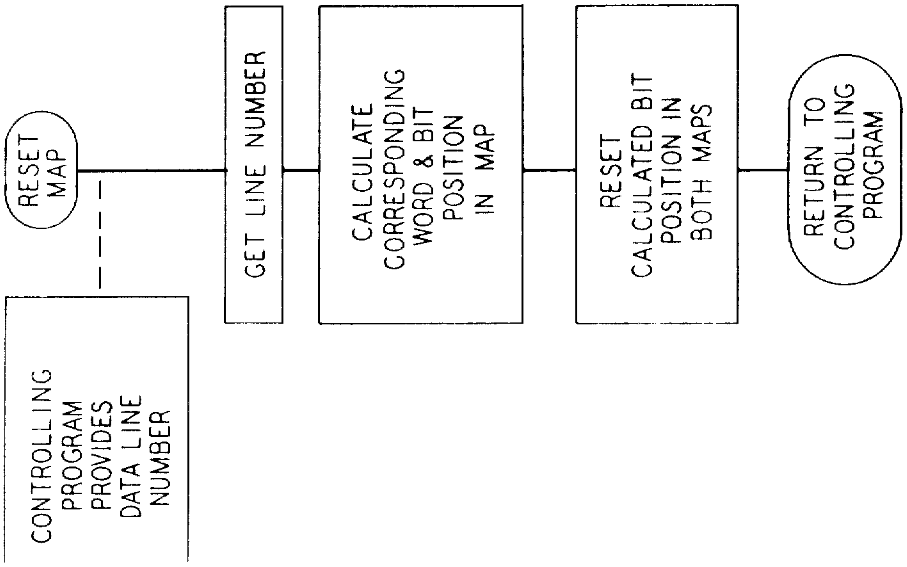
FIGS. 5, 6, 7A, and 7B are flow diagrams illustrating the programmed method of operation for the apparatus of FIG. 1 in accordance with the present invention.
Figure 5:
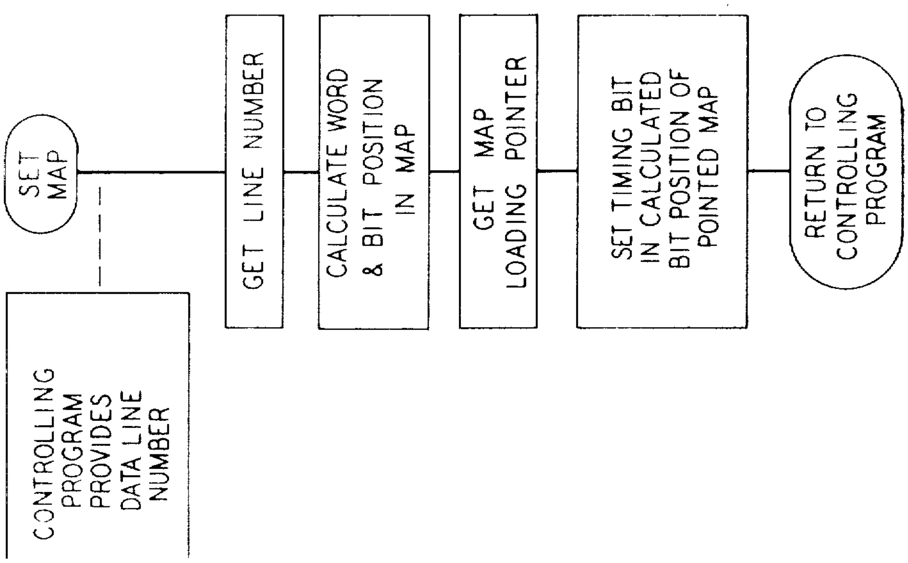

The invention is described in program terms utilizing flow charts of FIGS. 5 through 7 and the order structure for the system of FIG. 1. This order structure is discussed, for example, in the aforementioned Doblmaier et al. application under the headings "The Order Structure for Central Control" and "Sequence Circuits in Central Control and Miscellaneous Orders." The order structure is also discussed to a limited extent in Part 1 of the aforementioned *Bell System Technical Journal* in "Organization of the No. 1 ESS Control processor" by J. A. Harr, F. A. Taylor, and W. Ulrich, beginning at page 1,845; and in "Organization of the No. 1 ESs Stored Program" by J. A. Harr, E. S. Hoover, and R. B. Smith, beginning at page 1,923. From the subsequent description herein of the flow charts in relation to the program, in terms of the aforementioned order structure, it will be apparent to those skilled in the art which processing functions must be provided to realize the map-timing technique in the cited processing system or in other systems using a different program language. It is assumed in all cases that appropriate data, definitions, and memory allocations have been provided for assembly of the program as is well known in the art.

FIG. 5 is a flow chart for a subroutine which sets a binary ONE in a map bit location corresponding to a data line on which a first signal event has occurred. The controlling program in the processing system which is associated with the line on which the first event has occurred provides the data line number. Upon getting that number the corresponding word and bit position in the timing maps are calculated and a pointer word indicating which of the two maps is at that time loading timing requests is obtained from memory. The location in the calculated bit position of the map indicated by the pointer is then set to the binary ONE condition. An embodiment having 16-bit map words is assumed. A program listing with orders in mnemonic form follows, with reference being to the system depicted in FIG. 1:

| | | | |
|---|---|---|---|
| (1).... | MAPTMR | S,K,F | Call MAPTMR macro for setting (S) a timing bit in the map location corresponding to the data line number in the K register. The F register is allocated to be available for use in program. |
| (2).... | WF | ϕ.17,K,PS | AND the word (W) in the K register with the binary representation of octal number 17 (ϕ.17) which is stored right adjusted in the L register (the use of the L register is wired in to be employed when required by the PS option which procures the AND function in this instruction). Place the results, i.e., the four least significant bits of the K register, in the F register. (This result represents the bit location within a map word for the line requesting timing.) |
| (3).... | HAMK | −4,MTP | Shift (H) the data line number in the K register to the right (−) by four bit locations (to divide that number by sixteen to get the number of the map word which contains the timing bit location for that line). Add the address in the map timer pointer (MTP) location of memory to index the map word number with the head address of the map which is at this time loading timing indicators (an executive control program changes the pointer periodically to provide the timing function as will be subsequently described). Place the sum, i.e., the absolute address, in the K register. (This is a combined order, for shifting the K register and adding memory, which is available in the order structure of the system of FIG. 1 to save machine time; but the same result could, of course, be accomplished by separate shifting and adding instructions.) |
| (4).... | ML | Y4DIAG,F | Go to memory at a head address location Y4DIAG, indexed down by the contents of the F register (which at this time contains the map word bit position information), and move the word in that memory location to the L register. (This instruction extracts from memory the single-ONE mask which has a ONE in the bit position corresponding to the line requesting timing.) |
| (5).... | MB | O,K | Go to the memory address contained in the K register (from the HAMK instruction, the K register contains the absolute address of the word sought) and move the contents of that location to the B register. (The B register now contains the map word with the timing bit location that corresponds to the requesting line.) |
| (6).... | LM...... | ... O,K,EL | Using the insertion masking (EL) option with the mask in the L register, place the contents of the B register into memory at the word address contained in the K register. This restores the map word to its proper location and modified by the insertion of a binary ONE in the location corresponding to the requesting data line. Control is now returned to the client, or controlling, program for that line. |

FIG. 6 depicts the flow diagram for resetting timing bits in the maps upon the occurrence of a second signal event, i.e., acknowledgement by an interrogated line, within the minimum predetermined timeout interval. This program is similar, in some respects, to the program for setting a map location. Thus, the controlling program provides a data line number. The corresponding word and bit position in the timing map are calculated, and that bit position is reset to the ZERO state in both maps. As illustrative program listing follows:

| | | | |
|---|---|---|---|
| (1).... | MAPTMR | R,K,F | This instruction calls the MAPTMR macro for resetting (R) a timing bit for the data line number contained in the K register. Again the F register is held available. |
| (2).... | WF | ϕ.17,K,PS | As for the same instruction in the set macro, the four least significant bits of the data line number, representing the bit position in a map word, are separated and placed in the F register. |
| (3).... | HML | −4,Y4DIAG,F,C | The data line number in the K register is right-shifted by four bit locations thereby calculating the corresponding map word number and leaving it in right adjusted form in the K register. The single-ONE mask corresponding to the bit position in the F register is extracted from the Y4DIAG sector of memory, and complemented (C) to form a single-ZERO mask. |
| (4). . | MF | EVMP,K,PL | Go to the memory location defined by the EVEN MAP head address (EVMP) indexed with the map word number in the K register to get |

| | | | |
|---|---|---|---|
| | | | the correct EVEN MAP word. AND that word with the single-ZERO mask in the L register (as indicated by the PL option for this instruction) for changing to ZERO only the binary ONE in the bit location for the timed out line. Place the modified map word in the F register. |
| (5).... | FM | EVMP,K | Move the modified EVEN MAP word from the F register back to the memory location from which it was derived, i.e., EVMP indexed with the contents of the K register. |
| (6)... | MF | ϕDMP, K, PL | These instructions (6) and (7) perform the same operations as the preceding two instructions (4) and (5) but using the ODD MAP instead of the EVEN MAP. Thus, the timed out bit location has been reset in both maps and control is returned to the client program. |
| (7)... | FM | ϕDMP, K | |

Figure 7A:
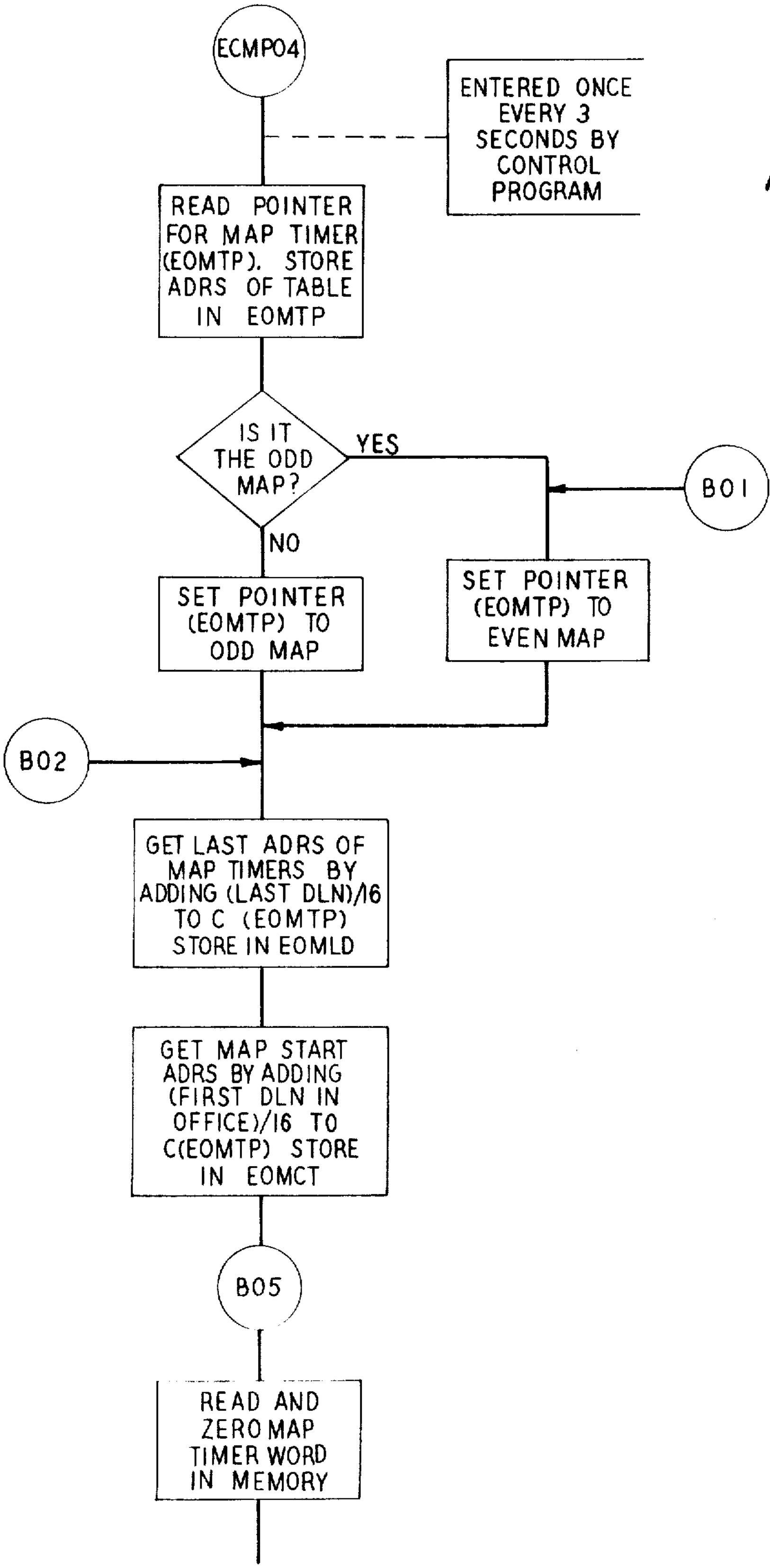
Figure 8:
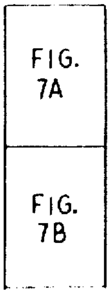
FIG. 8 is a diagram illustrating the manner in which FIGS. 7A and 7B go together to form a single flow diagram.
Figure 7B:
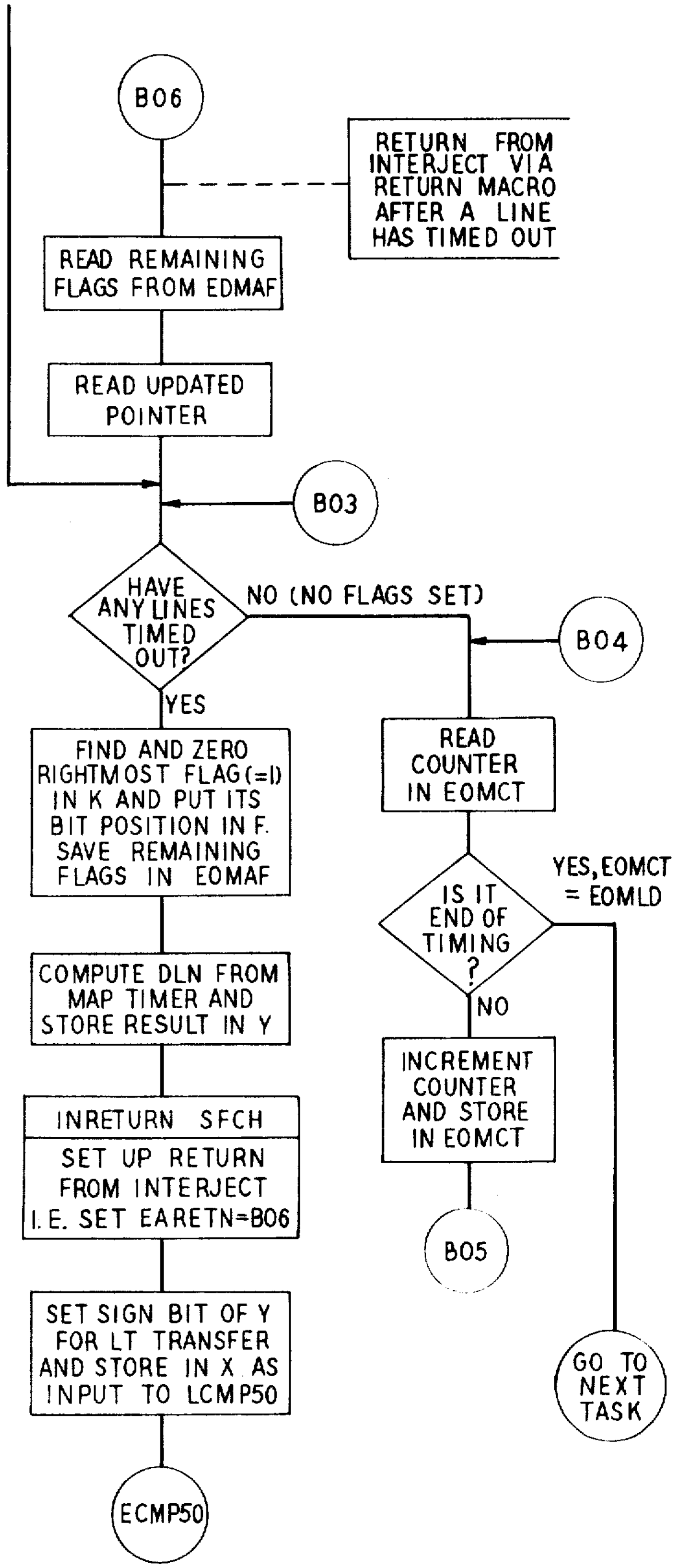

Apart from the foregoing procedures for setting and resetting timing status bits in the memory map sectors, there is a map-switching routine to be included in the executive control program for the system of FIG. 1 for implementing map timing. This routine controls the periodic switching of functions between ODD and EVEN MAPS for fixing the minimum interval that can expire before a timeout is indicated. A flow chart for the map-switching routines is shown in FIGS. 7A and 7B, and one program listing for implementing the routine is presented below. Since the routing includes a number of decision branches, some of the instructions in the program listing are accompanied by additional reference characters which are also included on the flow chart of FIGS. 7A and 7B to aid in associating the chart and the program. The following program starts at the point at which the processor 17 of FIG. 1 completes the transition from the main executive control program and goes to a previously defined memory head address ECMPO4 at which the map-switching instructions begin.

| | | | |
|---|---|---|---|
| ECMPO4.. | SYN | X. | This instruction indicates at X. the numerical location of the first operation to be performed in the map switching routine of the executive control program. |
| | MK | EOMTP | Move from memory to the K register the EVEN-ODD map timing pointer found at the memory location EOMTP and comprising the head address of the particular map which is at this time loading timing requests. |
| | KM | EONTP | Move from the K register to the memory location EONTP the map pointer which indicates the map that will become the nonloading map. |
| | CWK | EOϕDMP | Compare the map pointer word in the K register with the head address of the ODD MAP, and if a match is found set the C flipflops to ZERO. |
| | TCAZ | BO1 | Transfer to the program location BO1 if the C flip-flops indicate a match on the preceding instruction. (This means that the ODD MAP had been loading and the map timing pointer must be changed to the EVEN MAP.) Otherwise take the next following instruction. |
| | WY | EOϕDMP | If there was no match in the foregoing compare operation, place in the Y register the word at EOϕDMP, which had been previously assigned during assembly of the program to contain the head address of the ODD MAP. |
| | ENTJ | BO2 | Execute the next following instruction and then go to program location BO2. |
| | YM | EOMTP | Move the contents of the Y register to memory location EOMTP to serve as the new map timer pointer. |

| | | | |
|---|---|---|---|
| BO1 | WY | EOEVMP | For the case in which the foregoing compare operation had indicated a match, the next pointer should be the head address of the EVEN MAP and this instruction places that address word in the Y register. |
| | YM | EϕMTP | Move the contents of the Y register to the map timing pointer (MTP) location (EϕMTP) in memory. |
| BO2 | MK | JϕLDLN | It is now necessary to establish boundaries in memory for scanning the map which is to begin loading timing request. This instruction moves from memory to the K register the contents of location JϕLDLN which comprises the name of the largest, and hence the last, data line number in the switching office being served. |
| | HC | 4 | Contents of the K register, largest data line number, are right-shifted by four bits (instruction calls for complementing (C) the number 4 to obtain negative 4 which indicates a right shift of four bits). This operation calculates the word number in the map which contains the timing bit location corresponding to the largest data line number. |
| | AYR | O,K | Add the contents of the Y register, the head address of the map to be scanned, to the contents of the register specified in the R subfield, in this case the map word number of the largest data line number which is in the K register, and place the sum into the K register. That sum is the absorlute address in memory of the map word containging the timing status bit location of the last data line number in the office. |
| | KM | EOMLD | Move the contents of the K register to memory at the location EOMLD. |
| | MK | JϕFDLN | Move from memory location JϕFDLN to the K register the name of the first data line number in the switching office. |
| | HC | 4 | Right-shift the contents of the K register by four bits to obtain the map word number of such first data line number. |
| | AKR | O,Y | Add the contents of the K and Y registers together and store the sum, i.e., the absolute address in memory of the first data line number, in the Y register. |
| | YM | EOMCT | Store the foregoing address from the Y register in memory at EOMCT as the beginning address of the map which is to be scanned. |
| BE5 | MK | O,Y | Move from memory to the K register the contents at the address contained in the Y register, i.e., move the first word of the map to the K register. |
| | ENTJ | BO3 | Transfer to the program location BO3 upon completion of the execution of the next instruction. |
| | EZEM | O, Y | This instruction ZEROS the memory location defined by the address in the Y register; in this first case that is the first word of the map being scanned. This is a combination type of instruction which causes the machine to set an all-ZERO word in an index register and then move the contents of that index register into memory at the address contained in the Y register. |
| B O6 | MK | EOMAF | This instruction saves the contents of the K register, i.e., the map word to be scanned, in memory location EOMAF in the event that there should be phial ONES therein which should be subsequently identified. |
| | MY | EOMCT | Move from memory location EOMCT to the Y register the address of the memory word which had just been ZEROED, i.e., the word which is being scanned foı |

```
                              ONES indicating that lines
                              have timed out.
B03      TZRFZ    B04         Look at the contents of the K
                              register, i.e., the map word to
                              be scanned, and (a) if logical
                              ZERO, i.e., all-ZEROS,
                              transfer to program location
                              B04 to initiate scanning of
                              the next map word; or (b)
                              if contents of K register are
                              not ZERO find the rightmost
                              ONE, place its bit location
                              in the F register, and ZERO
                              that bit location in the K
                              register.
         KM       EOMAF       Assuming that the word con-
                              tained at least a ONE, trans-
                              fer from the K register to
                              memory location EOMAF
                              the modified K register con-
                              tents.
         MB       EOMTP       Move from memory location
                              EOMTP to the B register the
                              beginning address of the map
                              which is now being scanned.
         WK       ,Y          Store in the K register the
                              address of the word now being
                              scanned i.e., the address in the
                              Y register.
         SBR      ,K          Subtract the contents of the B
                              register from the contents of
                              the K register and put the
                              result in the K register. This
                              subtracts from the absolute
                              address of the word being
                              scanned, the head address of
                              the map being scanned to
                              produce in K the map word
                              number of that word.
         H        4           Left shift by four bits the con-
                              tents of the K register. The
                              map word number of the word
                              being scanned is multiplied
                              by 16 and placed in the most
                              significant bit positions of the
                              K register for reconstructing
                              part of the data line number.
         AFR      O,K         The bit location, in the F
                              register, of a detected ONE
                              in the scanned word is added
                              to the contents of the K
                              register to complete recon-
                              struction of the data line
                              number of the timed out line.
         WY       ,K          Place in the Y register the data
                              line number now resting in the
                              K register.
INRETURN FORMAT(2),AVLREG(F),AVLREG(Z),ADDR(B06)
                  WF          B06
                  MCH         E4RETN,SZ
                  FM          ø,17777777,Z,ES
                              This INRETURN macro puts
                              the B06 program location in
                              memory location E4RETN
                              through a 22-bit mask (for
                              a system using a 23-bit word)
                              to establish a return program
                              location at which to resume
                              the search for ONE-bit time-
                              out flags in the same or other
                              map words when the executive
                              control program has taken
                              care of the data line which was
                              indicated to have timed out
                              and comes back to the map
                              switching program.
         WX       E,22,Y      The contents of the Y register,
                              i.e., the data line number, are
                              placed in the X register; and
                              a binary ONE is placed in the
                              leftmost bit of the X register
                              to provide an input for use in
                              determining the controlling
                              program for that data line
                              number.
         T        ECMP50      Transfer to a subroutine ECMP-
                              50 for determining the con-
                              trolling program for the data
                              line number in the X register.
B04      MK       EOMCT       For the case where all ZEROS
                              are found in the map word
                              scanned, move to the K regis-
                              ter from memory location
                              EOMCT the address of the
                              map word which has just
                              been scanned.
         CMK      EOMLD       Compare the contents of the K
                              register with the address at
                              memory location EOMLD,
                              i.e., the memory address of
                              the last word of the map being
                              scanned.
           GOTOEC       MP,465,TCAZ
           TCAZ         465-400+EOMPMP
                              If the foregoing comparison pro-
                              duced a match, the complete
                              map has been scanned and
                              control returns to the execu-
                              tive control program to allow
                              the new map to start loading
                              timing requests.
         WY       1,K         If the foregoing comparison
                              produced a mismatch, the
                              scanning of the map is not
                              complete yet and the contents
                              of the K register, i.e., the
                              address of the word which
                              has just been scanned, are
                              incremented by unity and
                              transferred to the Y register.
         ENTJ     B05         Transfer to program location
                              B05 after execution of the
                              next following instruction in
                              order to begin examination
                              of the next map word.
         YM       EOMCT       Transfer from the Y register to
                              the memory location EOMCT
                              the address of the new map
                              word to be scanned.
```

There have now been described the routines for setting and resetting timing bits in map-timing sectors and the executive control routine for periodically switching the functions of map sectors for timing. These programs permit the data lines 10 in the switching office to have their respective stations polled in independent sequences for the respective lines in accordance with their respective line-controlling programs. Individual requests for writing a timing bit or erasing a timing bit in the map timer are accumulated in buffering hopper registers 20 of the processor 17 and served on a first come, first served basis. The speed of that service has been found to be sufficient so that there is no excess accumulation of requests in the hopper and no delay of the data line operation as a result of the map timing. The use of the memory sector and pointer-switching rate to define the minimum timeout period for the various data lines has proven satisfactory for polling multiple multistation lines with a substantial saving of allocated memory space. Thus, thousands of data lines have been served with the allocation of two memory bits per line for map-timing sector storage, 2 memory words for map pointers, 5 memory words for other miscellaneous pointers, and 16 memory words for mask storage.

Although the present invention has been described in relation to specific embodiments thereof, it is to be understood that additional embodiments and modifications which will be obvious to those skilled in the art are included within the spirit and scope of the invention.

What is claimed is:

1. A method for monitoring circuits for timeout of a predetermined interval after a first signal event and without occurrence of a second signal event, said method comprising the steps of initiating a request for a timing operation at the time of each said first event, storing a timing request indication as an information bit in a first of at least two memory sectors on the occurrence of said first signal event, erasing said indication on the occurrence of said second signal event before timeout, cyclically steering timing requests to a different one of said sectors at the end of each time period of duration equal to said interval, and in conjunction with each steering of said requests to a new sector, examining such sector to identify with one of said circuits, and to erase, any timing request indication remaining in such sector.

2. The method in accordance with claim 1 in which said indication-erasing step comprises the substeps of translating an identification number for a circuit, upon which said second signal event has occurred, into a corresponding word and bit location in said memory sectors, fetching information stored at said word location in said first sector, providing a mask with only a single bit of a predetermined bit type, performing a logical AND operation with said mask and said information, replacing said information in aid first sector, and repeating said fetching, mask-providing, and AND-performing substeps for information stored in each other one of said memory sectors.

3. The method in accordance with claim 1 in which said request indicating step comprises the substeps of translating an identification number for a circuit to be monitored into a corresponding word and bit location in said memory sectors, fetching information stored at said word location in said first sector, providing a mask with only a single bit of a predetermined bit type in said bit location, and insertion-masking said information into said first sector using said mask to set said bit type in said bit location without disturbing the remainder of said information.

4. The method in accordance with claim 1 in which said steering step comprises the substeps of providing a program pointer for indicating to which of said sectors timing requests are to be steered, cyclically changing said pointer to indicate different ones of said sectors in a predetermined sequence of sectors, fetching from a sector indicated by said pointer all information stored therein in a predetermined sequence of memory words, and for each of said words, identifying the position therein of any bits indicating the presence of a timing request.

5. A method for using memory for monitoring timeout of a plurality of functions to determine whether or not each function is completed within at least a predetermined minimum timeout period, said method comprising the steps of establishing plural sectors in memory for storing indications that any of said functions have been started, and switching said sectors in recurring sequence to receive said indications for a predetermined period for each sector, said period being of substantially the same duration as said predetermined minimum timeout period for said functions.

6. In combination, a pair of memory means for receiving timing status indications for determining whether or not a predetermined function is completed within at least a predetermined minimum timeout period, and means switching the memory means of said pair to receive, in an alternating sequence, said status indications, said switching means including timing means for actuating said switching means so that each memory means receives said indications in each of its status-indication-receiving parts of said sequence for an interval of duration which is substantially the same as said period.

7. In combination, a plurality of communication lines, for each of which lines there is to be independently indicated following the occurrence of a first signal a timeout of at least a predetermined minimum duration in the absence of the occurrence of a second signal, memory means having plural sectors each including a different bit storage location corresponding to each one of said lines for storing a binary coded signal bit indication of predetermined status information about such line, means switching said sectors in recurring sequence to receive said status information from said lines, the period between such switching operations being equal to said minimum duration, means responsive to said first signal on one of said lines for causing the corresponding bit location for such line in a receiving one of said sectors to be set to a first binary code state, means thereafter responsive to occurrence of said second signal on said one line, before timeout and before the next subsequent sector switching in said sequence, resetting to a second binary state said corresponding bit for such line, and means actuatable at the end of each said period for scanning the next one of said sectors in said recurring sequence to detect every one of the bit locations of such sector which is still in said first state, and said scanning means including means for resetting all of the last-mentioned detected bit locations prior to reception of said status information in said next one of said sectors.

8. The combination in accordance with claim 7 in which said scanning means includes means initiating a communication-line service function for a line corresponding to a bit location reset by said scanning means.

9. The combination in accordance with claim 7 in which said memory means includes two of said memory sectors, and said switching means includes means switching said two sectors in alternation to receive said status information.

10. The combination in accordance with claim 7 in which said communication lines are data-transmission lines each having a plurality of data stations coupled thereto, a data control station is provided for supervising communication among said stations on any one of said lines and among said lines, and said control station includes, means interrogating said stations individually, as to the readiness of such station to communicate, by applying said first signal to such line, and each of said stations including means normally responsive within only a part of said timeout duration for applying said second signal to such line.

11. The combination in accordance with claim 7 in which said bit-resetting means comprises means resetting to said second state such bit location in said receiving sector and in all other of said sectors.

* * * * *